United States Patent [19]
Stock et al.

[11] 3,832,406
[45] Aug. 27, 1974

[54] PRODUCTION OF MONOCHLORODIMETHYL ETHER

[75] Inventors: Arthur Stock, both of County Durham, England

[73] Assignee: Rohm and Haas Company, Philadelphia, Pa., by said Stock

[22] Filed: May 27, 1970

[21] Appl. No.: 40,975

[30] Foreign Application Priority Data
June 2, 1969 Great Britain..................... 27751/69

[52] U.S. Cl............................................. 260/614 R
[51] Int. Cl....................... C07c 41/10, C07c 41/00
[58] Field of Search................................. 260/614 R

[56] References Cited
UNITED STATES PATENTS

| | | | |
|---|---|---|---|
| 2,081,322 | 5/1937 | Carney.................................. | 23/263 |
| 2,133,735 | 10/1938 | Waterman et al................... | 260/614 |
| 2,373,501 | 4/1945 | Peterson............................... | 260/667 |
| 2,652,432 | 9/1953 | Bauman et al....................... | 260/614 R |
| 2,667,516 | 1/1954 | Bauman et al....................... | 260/614 R |
| 2,681,939 | 7/1954 | Bauman et al....................... | 260/614 R |
| 2,704,299 | 3/1955 | Buc........................................ | 260/614 R |
| 3,086,060 | 4/1963 | Greer..................................... | 260/614 R |

FOREIGN PATENTS OR APPLICATIONS

| | | | |
|---|---|---|---|
| 108,830 | 11/1963 | Czechoslovakia................... | 260/614 |
| 108,850 | 11/1963 | Czechoslovakia................... | 260/614 |
| 1,056,589 | 1/1967 | Great Britain....................... | 260/614 |
| 673,809 | 6/1950 | Great Britain....................... | 260/614 R |

*Primary Examiner*—Howard T. Mars

[57] ABSTRACT

A process for the production of monochlorodimethyl ether which comprises continuously contacting, in a first zone, hydrogen chloride with a mixture of methanol or methylal and formaldehyde, allowing the reacting mixture to pass under the influence of the heat of reaction into a reflux zone wherein heat is removed to condense it, condensed material returning to the first zone, and removing reacted material from the first zone and cooling it in the presence of excess hydrogen chloride.

2 Claims, 1 Drawing Figure

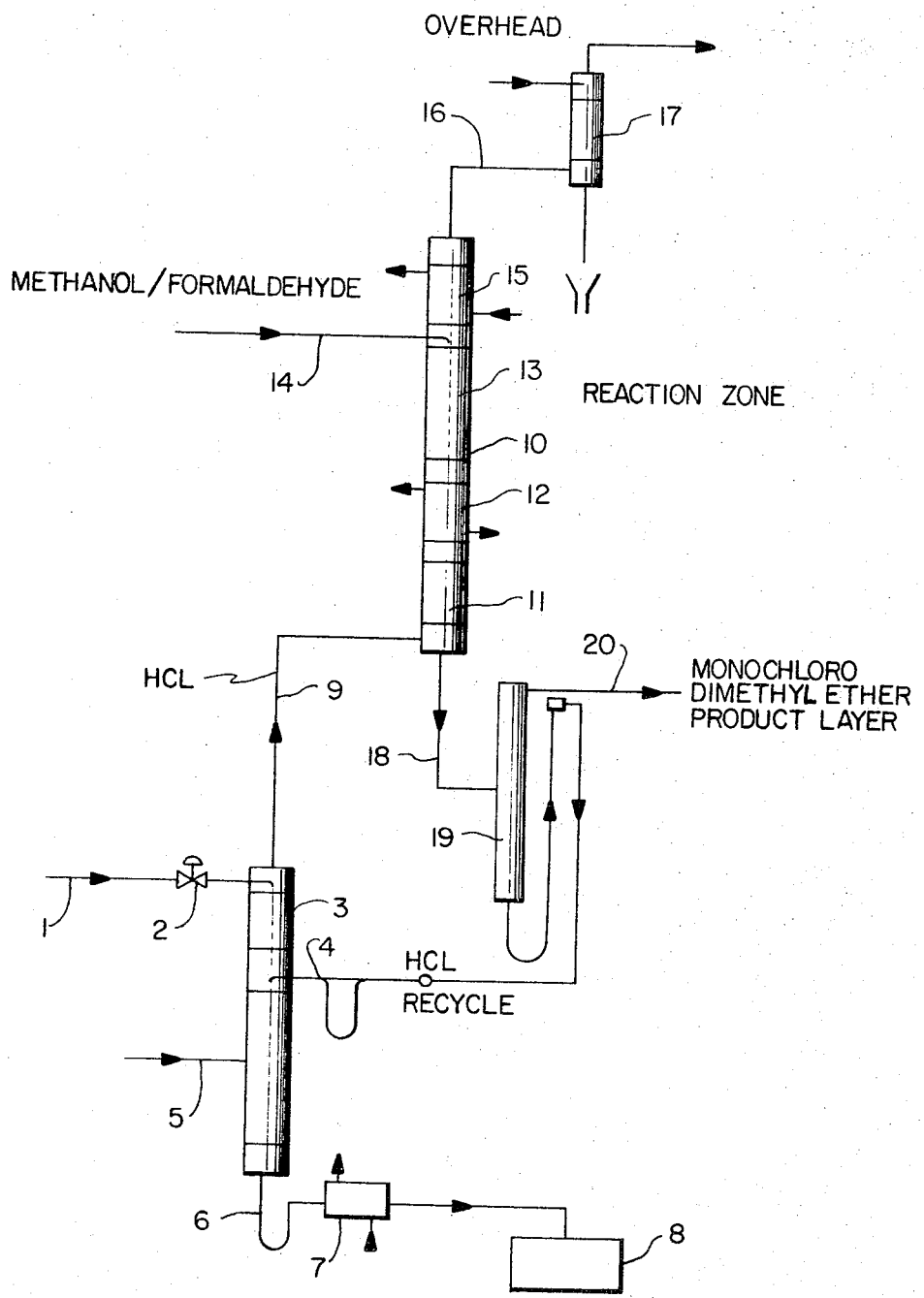

PRODUCTION OF MONOCHLORODIMETHYL ETHER

This invention is concerned with the production of monochlorodimethyl ether.

The invention provides a process for the production of monochlorodimethyl ether which comprises continuously contacting, in a first zone, hydrogen chloride with a mixture of methanol or methylal and formaldehyde, allowing the reacting mixture to pass under the influence of the heat of reaction into a reflux zone wherein heat is removed to condense it, condensed material returning to the first zone, and removing reacted material from the first zone and cooling it in the presence of excess hydrogen chloride.

It is known to produce, on a batch or continuous basis, monochlorodimethyl ether from chlorosulphonic acid, water, methanol and formaldehyde. However, such processes have been limited in their usefulness because of the difficulty of the removal of the heat of reaction. This is particularly so in the case of a continuous process.

The process of the invention has the advantage that it overcomes difficulties associated with removal of heat from the exothermic reaction when carried out in a packed column.

One such difficulty arises when cooling tubes are placed in the middle of a packed reaction zone; this creates difficulties in providing a uniform reaction zone and uniform product. It is surprising that the reaction can tolerate the reflux conditions without the irreversible formation of undesired by-products, such as dichlorinated material. Thus, it has now been found that the heat of reaction can be readily removed by refluxing the reaction mixture and that the monochlorodimethyl ether forming reaction can be run at higher than expected temperatures, with good quantity and quality yields, at least for the short time encountered in the continuous process. It has also been found that the reaction mixture can be cooled by allowing one or more components thereof to boil (cooling by internal reflux), if the reaction mixture is subsequently cooled and contacted with fresh HCl as it leaves the reactor.

The cooling zone is preferably so located with respect to the first zone that bottoms from the first zone pass into the cooling zone and gas or vapour from the cooling zone pass into the first zone. With this arrangement a particularly preferred feature may then be introduced and that is to pass the HCl feed for the whole reaction through the cooling zone before it enters the first zone. This is a particularly convenient and economical way of providing the excess HCl in the cooling zone. This excess HCl is required in order to maintain substantially complete saturation of the aqueous component of the reacted material with HCl as it cools. So that there are no pockets of cooling or cooled reacted material not in contact with excess HCl it is most preferable for the cooling zone to comprise a heat exchange zone and a contact zone, the heat exchange zone being between the first zone and the contact zone.

As a modification of the process of the invention instead of cooling the reacted material in the presence of excess hydrogen chloride, the temperature of the reacted material may be maintained whilst it is removed to a separator wherein the aqueous HCl component is separated therefrom. After separation has been effected the reacted material may be allowed to cool.

The invention will now be more particularly described with reference to the accompanying Drawing which is a schematic representation of a process, for the production of monochlorodimethyl ether from chlorosulphonic acid, methanol and formaldehyde, including the preferred process of the invention.

Referring to the drawing chlorosulphonic acid is fed through line 1 and valve 2 into the top of a column 3 packed with Raschig rings. Part of the way down the column a line 4 extends into column 3 for introduction of aqueous HCl recycle produced as hereinafter described. Still further down the column 3 is a water inlet line 5 and from the base of the column is a line 6 through which $H_2SO_4$ produced by the reaction of the chlorosulphonic acid and water flows as a by-product through a cooler 7 to waste acid tank 8. The HCl produced by the reaction of chlorosulphonic acid and water, together with recycled aqueous HCl, flows from the top of column 3 through line 9 to the base of a second column 10. The column 10 is fitted, ascending the column, with a packed section 11, comprising an equilibrium zone, a heat exchange (cooling) section 12, a packed section 13, an inlet line 14 for methanol/formaldehyde and a heat exchange (cooling) section 15. The heat exchange sections 12 and 15 each comprise cooling tubes fabricated from graphite or other compatible material. The zone below packed section 13, i.e., packed section 11 and heat exchange section 12 together make up the cooling zone, the packed section 13 is the said first zone or reaction zone and the section above the packed section 13, i.e., heat exchange section 15 is the reflux zone.

Thus methanol/formaldehyde enters the column 10 through line 14 and passes down through the packing in section 13 where it contacts HCl counter-currently. In reaction section 13 the temperature will vary from about 43° C. to about 53° C., and more preferably from about 45° C. to about 50° C. Thus, exothermic reaction takes place, the temperatures at the top and bottom of section 13 attaining about 49° C. and about 45° C. respectively. This causes some of the reacting mixture to pass into cooling section 15 where it is condensed to return to the said first zone. Any uncondensed material which escapes from the reflux zone passes as overheads through line 16 to a water scrubber 17 and thence to waste. Reacted material passes as bottoms from the said first zone to the cooling zone where it is first cooled in heat exchange section 12 the cooled material then passing through packed section 11 and thence, at a temperature less than 30° C. through line 18 to separator 19.

In the cooling zone the reacted material is in counter-current contact with incoming HCl. This maintains an excess of HCl in contact with the reacted material, this being essential to ensure that the balance of the reversible reaction between HCl and methanol/formaldehyde does not move in favour of the dissociation of the product monochlorodimethyl ether or its decomposition. The packed section 11 ensures intimate contact between the HCl and the cooled reaction product.

As mentioned above the product monochlorodimethyl ether flows, in admixture with water saturated with HCl through line 18 to a separator 19 which is a residence tank wherein the mixture separates into an upper organic layer containing the monochlorodimethyl ether and a lower aqueous layer containing HCl. The monochlorodimethyl ether product layer is continuously run off through line 20 and the HCl-saturated aqueous layer is continuously run off from the lower part of the residence tank 19 through line 4 to the column 3 as above described. If purchased anhydrous HCl is used, column 3 can be omitted and the HCl layer recycled directly to column 10.

This recycle arrangement not only saves HCl but also eliminates waste of any monochlorodimethyl ether which, due to incomplete phase separation in the separator 19, remains trapped in the aqueous layer.

Of course the apparatus above described is so arranged hydraulically that the HCl gas in line 9 is at such a pressure that it can penetrate to the top of packed section 13.

Furthermore modifications of the just described embodiment will be apparent to those skilled in the art. For example the column packing may be replaced by bubble or sieve trays or other contact aids.

EXAMPLE

In an experiment conducted in an apparatus as described with reference to the drawing, the conditions set forth on pages 4, 5 and 6, above, applying:

Column 15 had an ID of 4 inches:
Packing was five-eighths inch Raschig rings;
Separator 19 was a 40 gallon polypropylene vessel;
Methanol/formaldehyde mole ratio was 1:1;
Methanol/formaldehyde feed rate 24 lb/hr;
HCl feed rate to column 13 was 13 lb/hr;
Chlorosulphonic acid feed rate to column 3 was 41 lb/hr;
Monochlorodimethyl ether production rate 29 lb/hr;

Monochlorodimethyl ether

| | |
|---|---|
| S.G. at 15.5° C | 1.087 |
| Purity by chloride | 95.9% |
| Purity by formaldehyde | 99.6% |
| Appearance — very good | |

Waste acid production rate    37 lb/hr

Waste acid

| | |
|---|---|
| S.G. at 20° C. | 1.737 |
| % $H_2SO_4$ | 81.5 |
| % HCl | 1.5 |
| % HCHO | 1.45 |
| % $CH_3OH$ | 4.0 |
| % Unknowns | 3.5 |
| % Water | 8.0 | all percentages being by weight.

The temperature of reacted product in line 18 was 20° C.

It should be noted that, instead of methanol, methylal can be used in the process of the invention. It should also be noted that, instead of using HCl which is produced directly or in situ from the chlorosulphonic acid, one can also use in the process of the invention anhydrous HCl from a suitable source such as a tankcar or tank truck. While the example above shows a precise methanol/formaldehyde mole ratio and feed rate and a precise HCl feed rate, it is understood that there may be some variation or tolerance in these items as set forth more particularly in one or more of the appended claims. Thus the methanol/formaldehyde mole ratio may be about 1 to 1, the methanol/formaldehyde feed rate about 24 lb./hr. and the HCl feed rate about 13 lb./hr.

We claim:

1. A process for the production of monochlorodimethyl ether which comprises continuously and counter-currently contacting in a vertical column, having a first zone comprising a packed section above a cooling zone comprising a heat exchange zone below the first zone and a contacting zone below the heat exchange zone at the bottom of the vertical column, hydrogen chloride with a stream comprising a mixture of a methanol or methylal and formaldehyde, the HCl coming in from the bottom of the vertical column, and the methanol and the formaldehyde coming in from the top of the vertical column, said column also having a reflux means at the top of the column above the entrance of the feed of the methanol and formaldehyde, allowing the reacting mixture to pass under the influence of the heat of reaction into said reflux zone wherein heat is removed in the reflux zone, and wherein the reacting mixture is condensed, and then allowing and passing the condensed material back to the first zone from the reflux zone, and removing reacted material from the first zone at the bottom and cooling it in the cooling zone in the presence of excess hydrogen chloride, the excess hydrogen chloride being present in sufficient quantity to maintain substantially complete saturation of any aqueous component of the reacting or reacted material with the HCl as it cools, the monochlorodimethyl ether forming reaction taking place in a temperature range of from about 43° to about 53° C., and recovering the monochlorodimethyl ether from the bottom of the vertical column.

2. A process according to claim 1 wherein the methanol/formaldehyde mole ratio is about 1 to 1, the methanol/formaldehyde feed rate is about 24 lbs. per hour, and the HCl feed rate is about 13 lbs. per hour.

* * * * *